United States Patent [19]
Schiller et al.

[11] Patent Number: 6,049,339
[45] Date of Patent: Apr. 11, 2000

[54] BLENDING WITH PLANAR MAPS

[75] Inventors: Stephen N. Schiller, Hayward; Daniel J. Clark, Los Gatos, both of Calif.

[73] Assignee: Adobe Systems Incorporated, San Jose, Calif.

[21] Appl. No.: 08/999,381

[22] Filed: Dec. 22, 1997

[51] Int. Cl.[7] .................................................. G06T 15/00
[52] U.S. Cl. .......................................... 345/435; 345/433
[58] Field of Search .................................... 345/418, 433, 345/434, 435, 436

[56] References Cited

U.S. PATENT DOCUMENTS

| | | | |
|---|---|---|---|
| 5,870,103 | 2/1999 | Luo | 345/435 |
| 5,889,527 | 3/1999 | Tsai | 345/435 |
| 5,892,521 | 4/1999 | Blossom et al. | 345/435 |
| 5,912,672 | 6/1999 | Liguori | 345/433 |
| 5,926,188 | 7/1999 | Kawamoto et al. | 345/435 |
| 5,936,634 | 8/1999 | Kawamoto et al. | 345/435 |

OTHER PUBLICATIONS

James F. Blinn, "Compositing, Part I: Theory," *IEEE Computer Graphics & Applications*, 83–87, Sep. 1994.

James F. Blinn, "Compositing, Part 2: Practice," *IEEE Computer Graphics & Applications*, 78–82, Nov. 1994.

T. Duff, "Compositing 3–D Rendered Images," *Computer Graphics*, vol. 19, No. 3, 41–44, 1985.

M. Gangnet et al., "Incremental Computation of Planar Maps," *Computer Graphics*, vol. 23, No. 3, 345–354, Jul. 1989.

Nievergelt et al., "Plane–Sweep Algorithms for Intersecting Geometric Figures," *Programming Techniques and Data Structures*, 739–747, 1982.

Preparata et al., "Computational Geometry, An Introduction," 2 pgs, 1985.

Wencheng et al., "Compositing Colors in Volume Rendering using Transparency Degree Ruler," *Chinese Journal of Advanced Software Research*, vol. 2, No. 4, 374–380, 1995.

"Clipping is an essential part of image synthesis," *Communications of the ACM*, vol. 35, No. 7, 57–63, Jul. 1992.

*Primary Examiner*—Phu K. Nguyen
*Assistant Examiner*—Cliff N. Vo
*Attorney, Agent, or Firm*—Fish & Richardson P.C.

[57] ABSTRACT

A system for blending graphical objects using planar map representations is described. A page description representation of an input document's graphical objects is converted, at least in part, into a planar map representation. A color is assigned to each region in the planar map as a function of the region's associated paths' transparency characteristics. In one embodiment, if the graphical processing system exhausts its memory during processing, those paths already converted to planar maps are rasterized. Any subsequent processing of graphical objects is thereafter performed in raster format. In another embodiment, an output page is divided into tiles where each tile may be rasterized independent of the other tiles. In yet another embodiment, graphical objects are processed in reverse order compared to their arrangement in the page description language representation.

49 Claims, 11 Drawing Sheets

BLENDING WITH PLANAR MAPS

BACKGROUND

The invention relates generally to blending operations on objects described in a page description language and, more particularly, to blending operations using planar map representations of those objects.

A page description language (PDL) is a high level, output device independent language for describing objects to be displayed on an output device. The POSTSCRIPT and PORTABLE DOCUMENT FORMAT (PDF) languages are well-known high level page description languages. Both POSTSCRIPT and PORTABLE DOCUMENT FORMAT are trademarks of Adobe Systems Incorporated of San Jose, Calif.

A PDL representation of a document (stored as a file) consists of a series of instructions and possibly images. Instructions are the commands defined in the chosen PDL. For example, one series of instructions may draw a line from point-x to point-y on a page. Images are raster representations of data. For example, an image may be a sampled photograph.

A PDL interpreter converts a PDL file from a series of instructions and images into a display list. A display list is a series of paths. A path defines a shape, a trajectory, and regions of all sorts. Paths may be composed of straight and curved line segments which may, or may not, connect to one another. A path's topology is unrestricted: it may be concave or convex; it may contain multiple closed subpaths, forming several distinct areas; and it may intersect with itself in arbitrary ways. Paths have three fundamental attributes: color; stroke; and fill. If a path is stroked, a line of some specified thickness and color is drawn along its boundary. If a path is filled, the current color or pattern is used to paint the entire area enclosed by the path. Images are described as a rectangular array of sample values.

Paths in a display list may lie in any arbitrary position on a page and may overlap one another. As shown in FIG. 1, the physical representation 100 of two overlapping circular paths (105 and 110) can generate three regions (115, 120, and 125). The display list representation 130 corresponding to the physical representation 100 can be represented by a list, path 1 105 and path 2 110, where the description of path 1 105 and path 2 110 includes information associated with their physical location on a page.

If more than two objects (paths) are present, the graphical processing system must be able to determine which parts of which paths overlap. One technique to represent a series of overlapping paths is known as planar mapping. A planar map is a list of non-overlapping regions that represent the original overlapping paths. For example, the planar map representation 135 of overlapping paths 1 and 2 (see 100) is a list of three non-overlapping paths; one path for each region 115, 120, and 125. A benefit of the planar map representation is that once the display list 130 is transformed into a planar map 135, no further calculations need be performed to determine which paths overlap. In a planar map no two paths overlap. For information on planar map representations see Gangnet et al., "Incremental Computation of Planar Maps," ACM SIGGRAPH '89 Conference Proceedings, Vol. 23, No. 3, 1989, and Preparata and Shamos, "Computational Geometry: An Introduction," Springer-Verlag, New York, 1985.

SUMMARY

In general, the invention provides apparatus and methods to blend graphical objects using planar map representations of those graphical objects. In one aspect, at least a portion of a page description language representation of graphical objects (having transparency characteristics) is converted into a planar map representation. A planar map region is assigned a color as a function of the transparency characteristics of the graphical objects associated with the planar map region.

In another aspect, the graphical objects are converted to a planar map representation two at a time. In another aspect, a portion of the graphical objects are processed as planar maps while another portion are processed in raster format. In yet another aspect, the generated planar maps may be generated in reverse order with respect to the order in which graphical objects are input. In yet other aspects, the generated planar map regions may be sorted and rasterized.

Advantages of the invention include, but are not limited to, one or more of the following: (1) planar maps allow blending to be performed in a device independent manner, both as to color space and resolution; (2) planar map blending can be done by either an output device (e.g., a raster image processor) or an application program or device separate from the output device; (3) if planar map blending is performed outside a raster image processor, no modifications to the raster image processor are necessary to support blending operations; (4) use of planar map blending can significantly reduce the speed of output generation by reducing the amount of overprinting in a final output frame buffer; and (5) full and partial reversion can allow a memory bound device to use planar map blending techniques. Other features and advantages of the invention will become apparent from the following description and from the claims.

DETAILED DESCRIPTION

Figure 1:
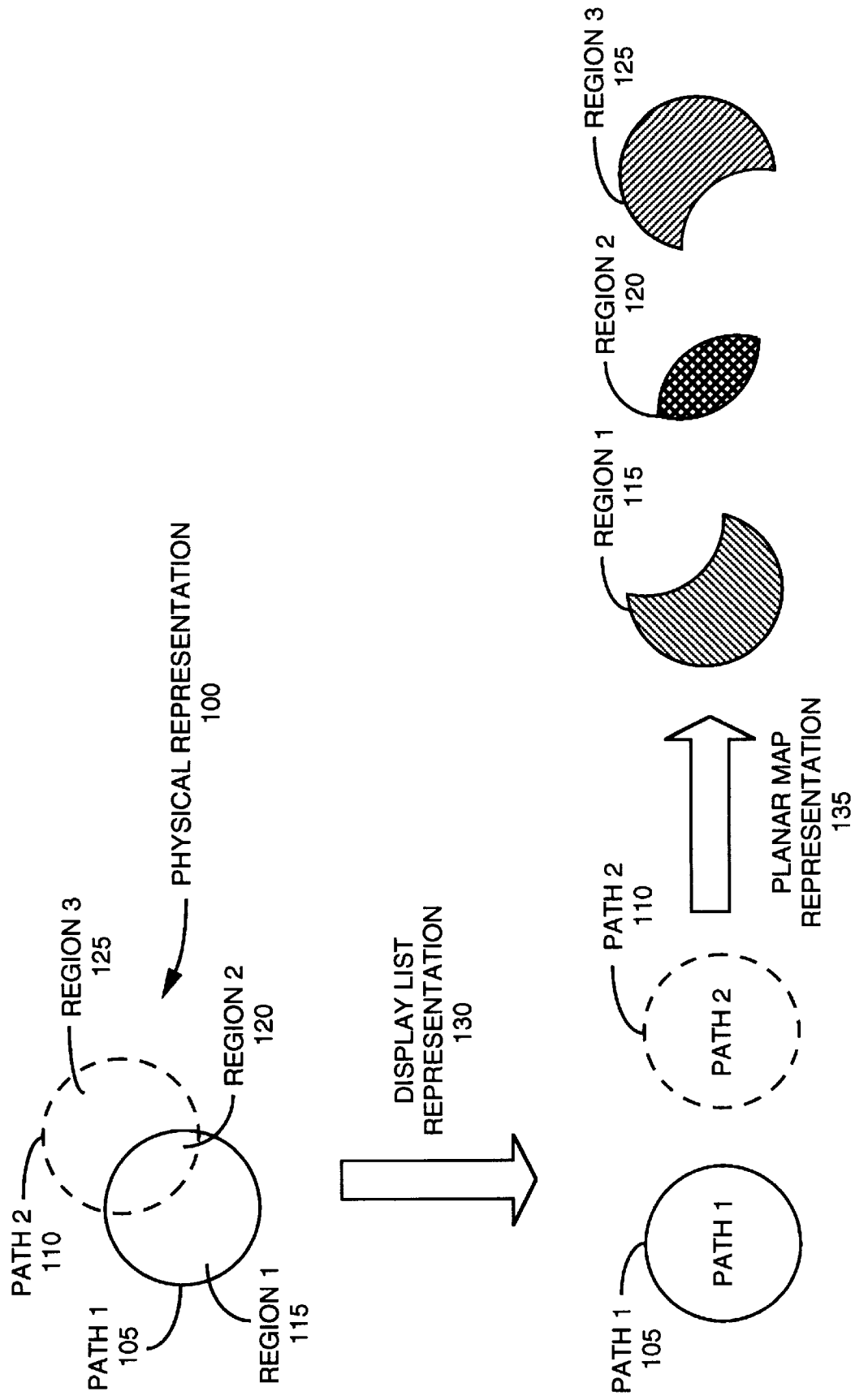
FIG. 1 illustrates the physical, display list, and planar map representations of two overlapping paths.

The following contemporaneously filed and commonly owned patent applications are incorporated by reference: "Dehalftoning of Digital Images" by Stephen Carlsen et al., attorney docket no. 07844/087001; "Blending Graphics Objects In A Frame Buffer" by Stephen Carlsen, attorney docket no. 07844/229001; "Blending Image Data Using Layers" by Stephen Carlsen et al., attorney docket no. 07844/231001; "Transparency Processing in a Page Description Language" by Lars Borg et al., attorney docket no. 07844/217001; and "Conversion of Alpha-Multiplied Color Data by Lars Borg et al., attorney docket no. 07844/230001.

A document may be a digitally stored file whose contents include one or more graphical objects described in terms of page description language (PDL) instructions and images. One or more PDL instructions can be combined to form a path. Some of the paths (also referred to as objects) may overlie other paths and some of the paths may be colored differently from other paths. In a path based representation, images are denoted by a path coincident to the image's array boundary.

In some graphical processing systems, each path may have a different transparency characteristic. In an image, each sample (pixel) within the image's boundary (i.e., its path) has an associated color and transparency characteristic which is accounted for during the blending process. The transparency of a path indicates the extent to which an underlying path may be seen through it. In graphical processing, a path's transparency is implemented through a technique known as blending. Blending involves combining a foreground color, associated with one path, and a background color, associated with an underlying path, to create a third color. Blending can give a path the appearance of being translucent. The present invention may be used in any system (hardware and/or software) that supports blending and generates a display list representation of page description data.

In one embodiment of a graphical processing system, see FIG. 2, blending graphical objects using planar maps proceeds as follows. An input PDL file 200 is transformed by a PDL interpreter 205 into a path-based representation 210. The path-based representation 210 is transformed by a planar map generator 215 into one or more planar maps 220. Blending planar map regions (areas within path overlaps) may be performed during planar map generation. Following generation and blending, the planar map regions are sorted 225 into proper print order. The result of operations 205, 215, and 225 is blended planar map output 230.

Figures 2, 3:
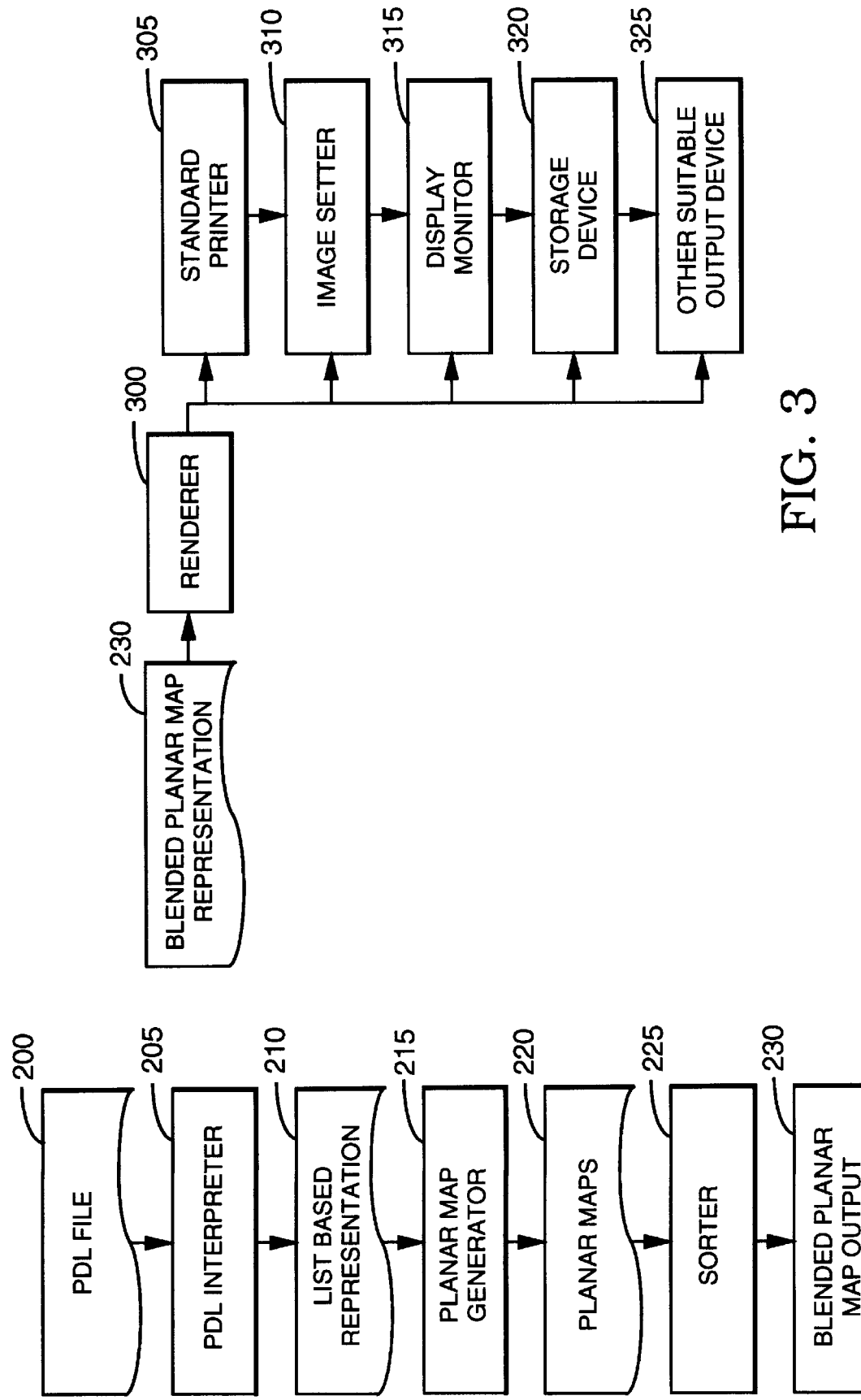
FIG. 2 illustrates a graphical image processor's process flow for blending graphical objects using planar maps.
FIG. 3 shows that blended planar maps may be conveyed to a number of different output devices.

As illustrated in FIG. 3, blended planar maps 230 may be conveyed to a renderer 300. The job of the renderer 300 is to generate a raster based representation (e.g., a bit stream) of its input. Renderer output may be sent to a standard printer 305 (color or grayscale), an image setter 310, a display monitor 315, a storage device 320, or any other suitable output device 325. Common storage devices 320 include, but are not limited to, magnetic disks (fixed, floppy, and removable), other magnetic media such as tape, optical media such as CD-ROM disks, and magneto-optical devices.

Any method to convert a path-based representation into a planar map representation may be used in step 215 of FIG. 2. For the remainder of this description, a planar map is a collection of non-overlapping regions that, together, correspond to one or more paths.

Blending is performed on a region-by-region basis and is a function of each path's transparency characteristic (e.g., translucent or opaque), color, and the specified blend mode. When generated, each planar map region is tagged with information indicating those paths associated with it. Each path, in turn, has an associated color and transparency characteristic. Regions are blended by using the path colors and transparency characteristics for all those paths associated with the regions being blended. (Tags are also used to sort the blended planar map regions as described below.) Some typical blend functions/modes are described in the copending and commonly assigned U.S. patent applications cited above.

Figure 4:
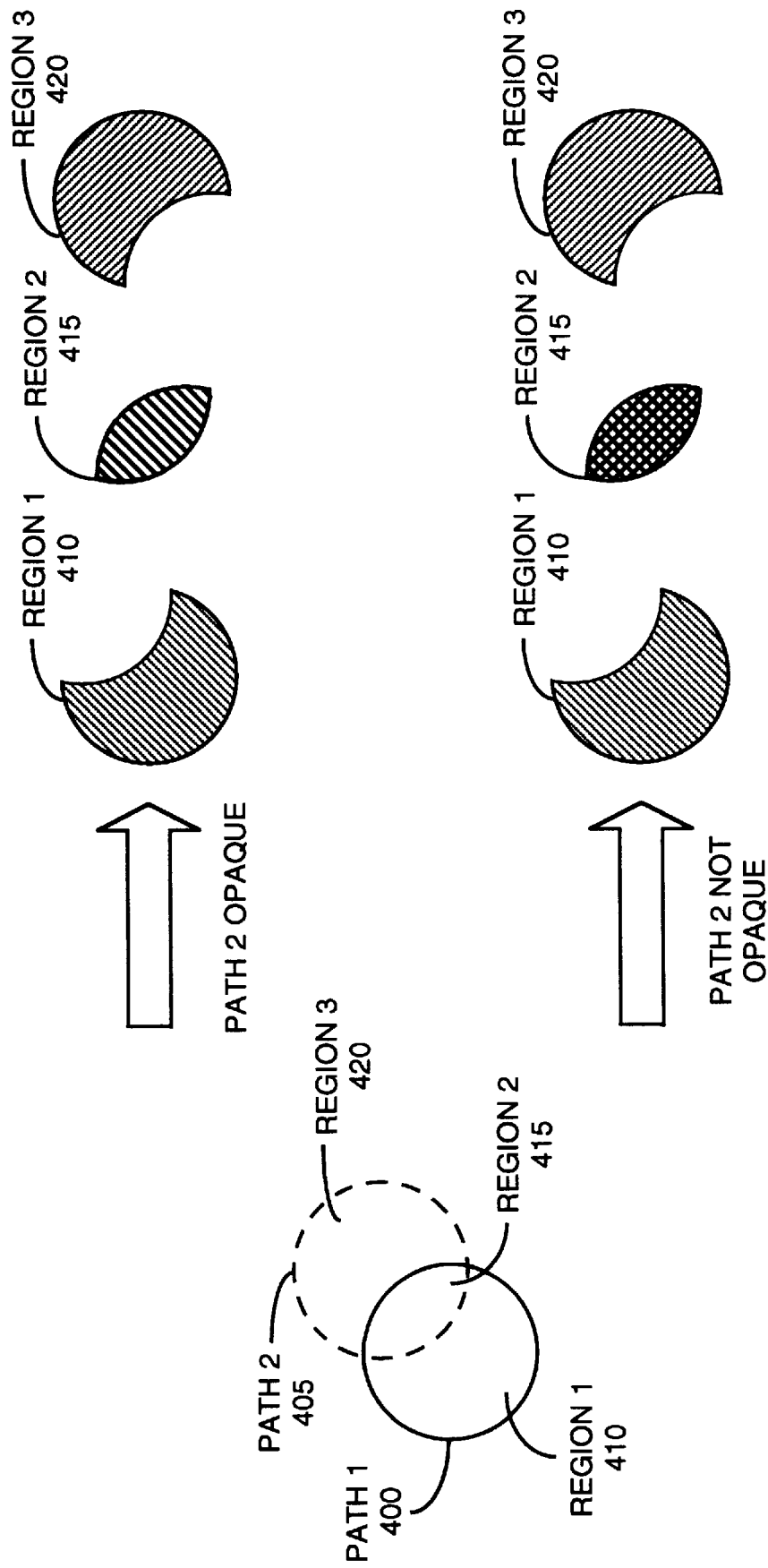
FIG. 4 shows two possible planar maps corresponding to two overlapping paths.

Referring to FIG. 4, path 1 400 and path 2 405 are two overlapping circular paths (let path 1 400 lie beneath path 2 405) whose planar map representation includes three regions. If path 2 405 is opaque, region 1 410 (associated only with path 1 400) is the same color as path 1 400, and both region 2 415 (path overlap area) and region 3 420 (associated only with path 2 405) are the same color as path 2 405. If path 2 405 is not opaque, region 1 410 remains the same color as path 1 400, region 2's 415 color is determined by the color of path 1 400, the color of path 2 405, and the specified blend mode. Region 3 420 remains the same color as path 2 405.

Figure 5:
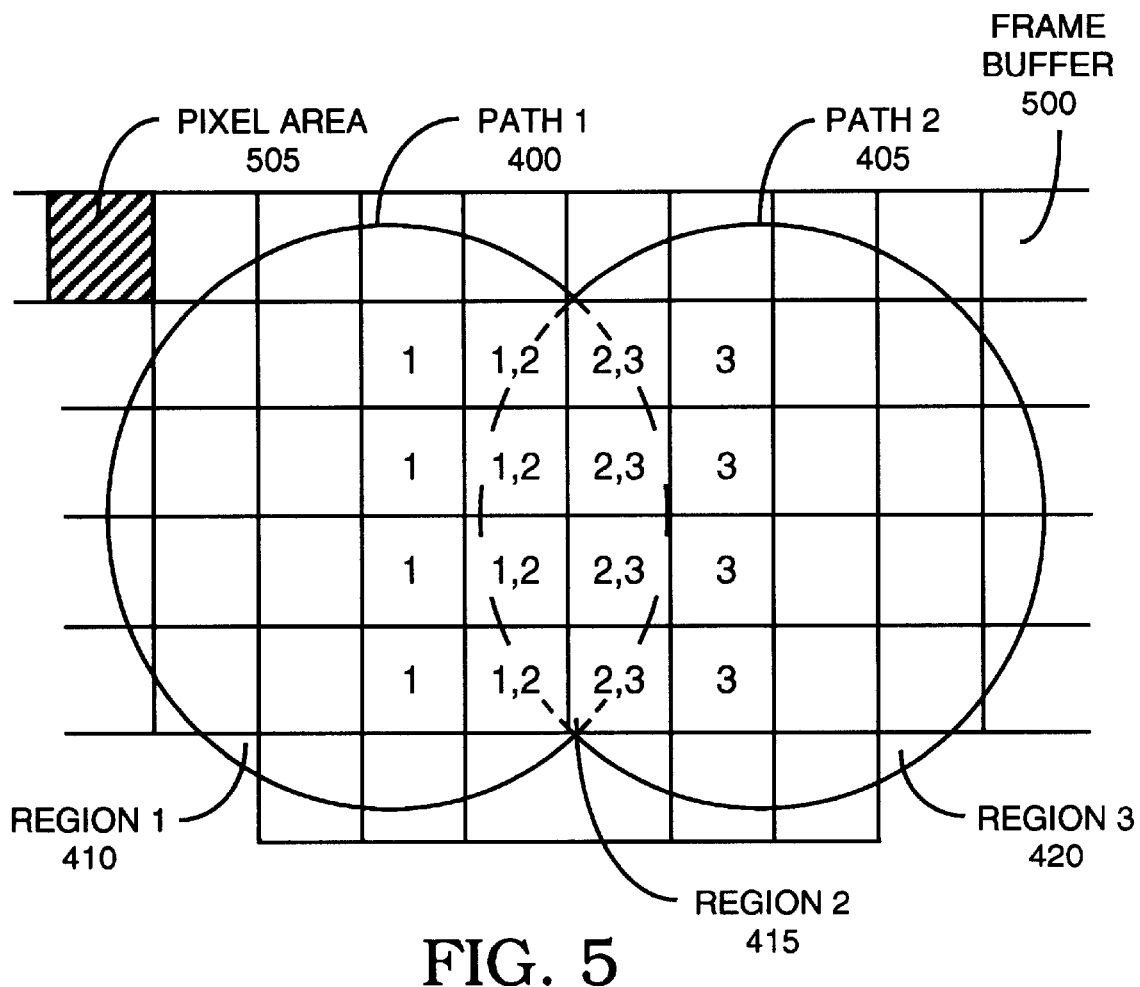
FIG. 5 illustrates the color assignment task when planar maps are rasterized.

When planar maps are rasterized (converted into raster format), each pixel in the raster buffer (the memory into which the planar maps are rasterized) must be assigned a color value so that the resulting output corresponds to the input's physical representation. In the standard over-scan technique used in many rasterization processes, any pixel inside a path and any pixel touched by the path is assigned that path's color. Pixels in which two or more regions abut have the potential of being assigned more than one color. This condition is shown in FIG. 5 where the grid represents part of a frame buffer 500, and each square represents a pixel (e.g., 505). The number inside each pixel represents the region whose color could be assigned to that pixel (not all pixels are labeled).

Since each pixel in a frame buffer can have only one value, a method for ensuring the proper color assignment is made must be performed. (Those of ordinary skill in the art will recognize that a pixel's value may be divided into multiple components. For example, if the raster buffer's color space is RGB, each pixel value includes three components; one each for red, green, and blue.) The proper assignment is that assignment which results in an output image that most closely approximates the graphical input's physical representation. This assignment results in an ordering of the planar map regions hereinafter referred to as the print order.

Because a pixel's value in a raster buffer generally corresponds to the last region rasterized into that pixel, the order in which planar map regions are rasterized determines which region's color is assigned to a given pixel. Thus, planar map regions must be sorted to ensure those planar map regions on top (as defined in the input PDL file 200) are rasterized after those on the bottom, i.e., to order the planar map regions into the print order. Information indicating whether a path is above or below another path is inherent in a graphical object's PDL file representation. Generally, those paths that are earlier in the PDL representation are lower (beneath) those paths that are later in the PDL representation.

One method to track which region's color should be assigned to a pixel is to associate a tag with each planar map region, where the tag identifies any path contributing to the region. In this method, paths identified in a tag must be organized from bottom to top, or top to bottom. (Here, the terms bottom and top refer to the PDL representation's order of the graphical objects.) That is, if region 'X' is defined by the overlap between path 1 and path 2, and path 2 is above path 1, its tag could be represented by the list <2, 1>. If region 'Y' is defined by the overlap between path 2 and path 3, and path 3 is above path 2, its tag could be represented by the list <3, 2>. All planar map regions can be sorted in accordance with their tag values. Those tags having higher first values are "above" those having lower first values. If the first value in two regions' tags are equal, the next tag value is inspected in the same manner. If two tags are the same up to an end point, the region having the longer tag is on top. Once tags are created and associated with planar map regions, any convenient sort procedure may be used to physically arrange the regions. For example, let region X's tag be <8, 5, 2>, region Y's tag be <7, 2>, and region Z's tag be <8, 5>. In this example, Region X corresponds to the top-most region, region Z corresponds to the next lower or middle region, and region Y corresponds to the lowest or bottom region.

Another method to generate and tag planar map regions is described in Table 1. In this method, the first two paths from the PDL representation are combined, to generate a first planar map, and assigned a size value. The size value can be based, for example, on the planar map's memory size (e.g., number of bytes of memory), the number of regions comprising the map, or the number of line segments included in the map. After size assignment, the planar map's regions are sorted. Regions are sorted based on the paths identifiers' that gave rise to the region. For example, if regions resulted from the overlap of two paths, each region would have a tag including each path's identifier. Once sorted, each region in the planar map is assigned an ordinal identifier (e.g., the number 1 through N for each of the planar map's N regions) which replaces each region's previous tag. The planar map is then pushed onto a stack (a temporary memory). As long as input paths remain to be processed, the next two paths from the PDL representation are combined to generate planar map PM-NEW and assigned a size value. Each region in PM-NEW is sorted and assigned an ordinal identifier. As long as the size of PM-NEW is greater than or equal to the size of the planar map on the top of the stack (PM-TOS), the stack is popped and PM-TOS is combined with PM-NEW to generate a new PM-NEW planar map which is then assigned a size value. Again, the regions in PM-NEW are sorted and assigned an identifier. (Since a planar map is a collection of one or more regions, and each region is a path, combining two planar maps is the same operation as creating a planar map from one or more paths.) When the size of PM-NEW is no longer greater than or equal to the size of the planar map stored on the top of the stack, PM-NEW is pushed onto the stack and the next two paths from the PDL representation are processed. These steps are repeated until all paths in the input PDL representation have been processed. If at any time the PDL representation includes only a single path, that path is converted into a planar map and processing continues as described above. If at any time a new planar map is generated and the stack is empty, the new planar map is pushed onto the stack and processing continues. When there are no longer input paths to be processed, planar maps are taken off the stack and combined.

TABLE 1

Pair-Wise Generation and
Tagging of Planar Map Regions get first two paths from the input PDL representation
combine paths to generate planar map PM-1
assign PM-1 a size value
sort regions in PM-1
assign each region in PM-1 an ordinal number
push PM-1 onto the planar map stack
while ( input paths remain to be processed ) {
  get next two input paths
  combine paths to generate planar map PM-NEW
  assign PM-NEW a size value
  sort regions in PM-NEW
  assign each region in PM-NEW an ordinal number
  while ( size_of(PM-NEW) is >= size_of(PM-TOS) ) {
    pop planar map stack and assign to PM-WORK
    combine PM-NEW and PM-WORK TABLE 1-continued Pair-Wise Generation and
Tagging of Planar Map Regions assign combination of PM-NEW and PM-WORK to PM-NEW
    sort regions in PM-NEW according to previously assigned
      ordinal numbers
    assign each region in PM-NEW an ordinal number
    update PM-NEW's size value
  }
  push PM-NEW onto planar map stack
}

Figure 6:
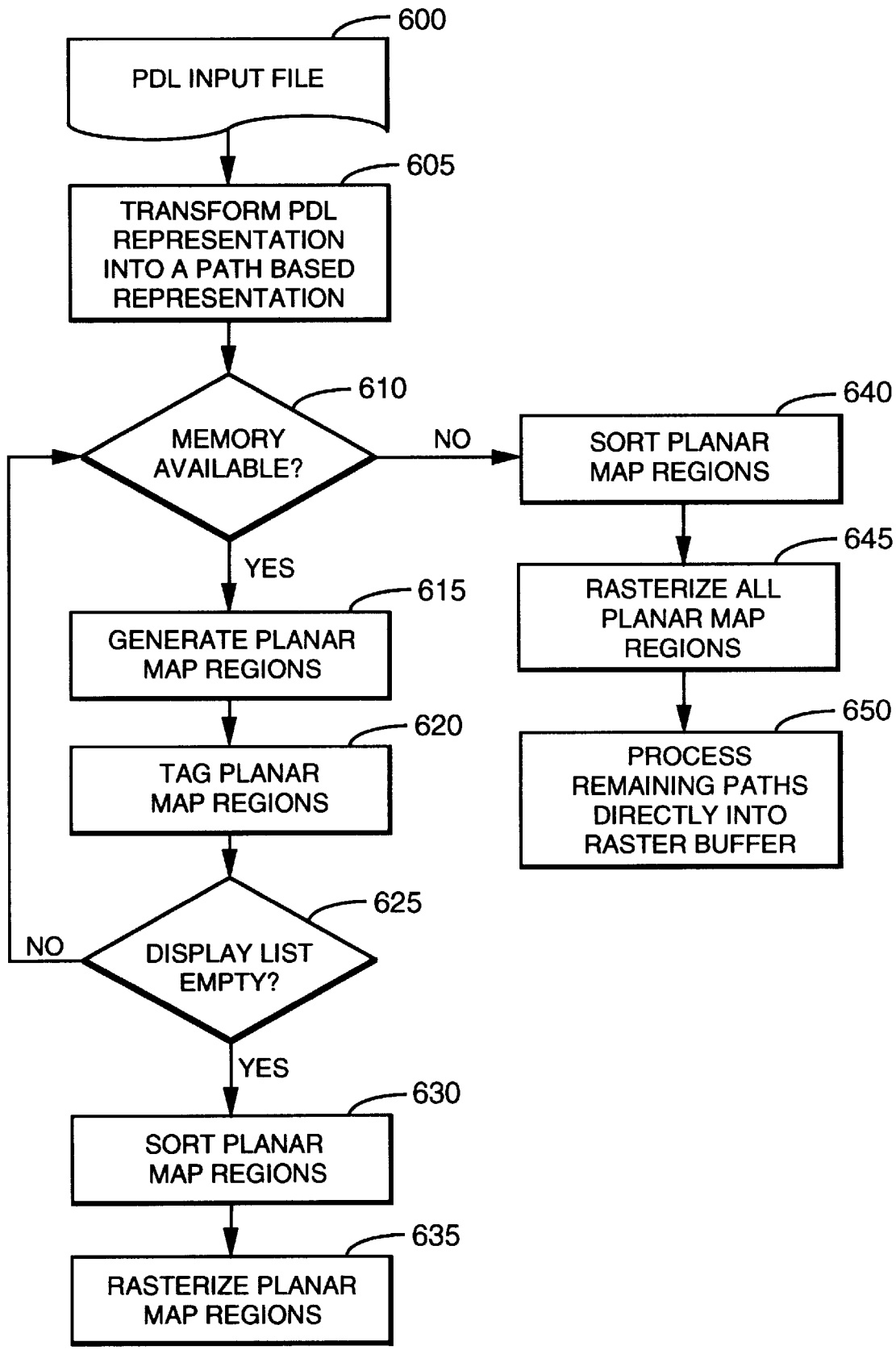
FIG. 6 shows another processing flow to blend graphical objects using planar maps.

In the alternative embodiment shown in FIG. 6, an input PDL file 600 is transformed into a list based representation at step 605. If the graphical processing system has sufficient memory to continue processing paths in planar map format (the 'yes' prong of step 610), one or more paths are transformed into a planar map (step 615) and the generated planar maps are tagged as described above (step 620). If no more input paths remain to be processed (the 'yes' prong of step 625), the processed planar map regions are sorted into print order (step 630) and rasterized (step 635). (Steps 605, 615, 620, and 630 implement the work flow of FIG. 2.) If additional input paths need to be processed (the 'no' prong of step 625), a memory check is made at step 610. If the graphical processing system has insufficient memory to continue processing paths in planar map format (the 'no' prong of step 610), any existing planar map regions are sorted as described above (step 640) and rasterized (step 645). Following step 645, any remaining paths are processed directly into raster form (step 650). Raster output is, generally, equivalent to renderer output and may be treated as such (see FIG. 3). In this embodiment, planar map generation, tagging, and any blending operations may be performed as described above.

Figure 7A:
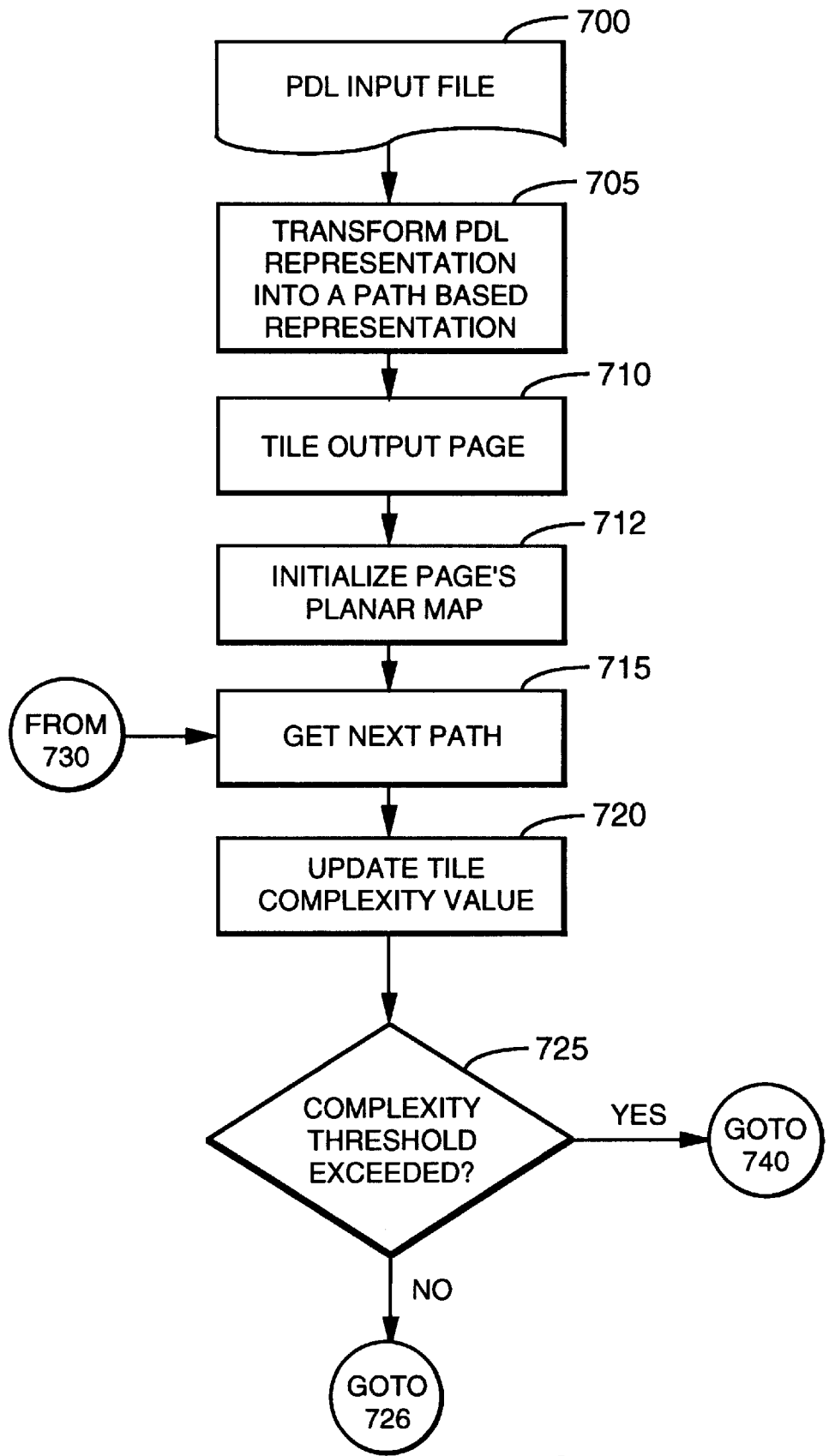
FIGS. 7A and 7B show yet another processing flow to blend graphical objects using planar maps.
Figure 7B:
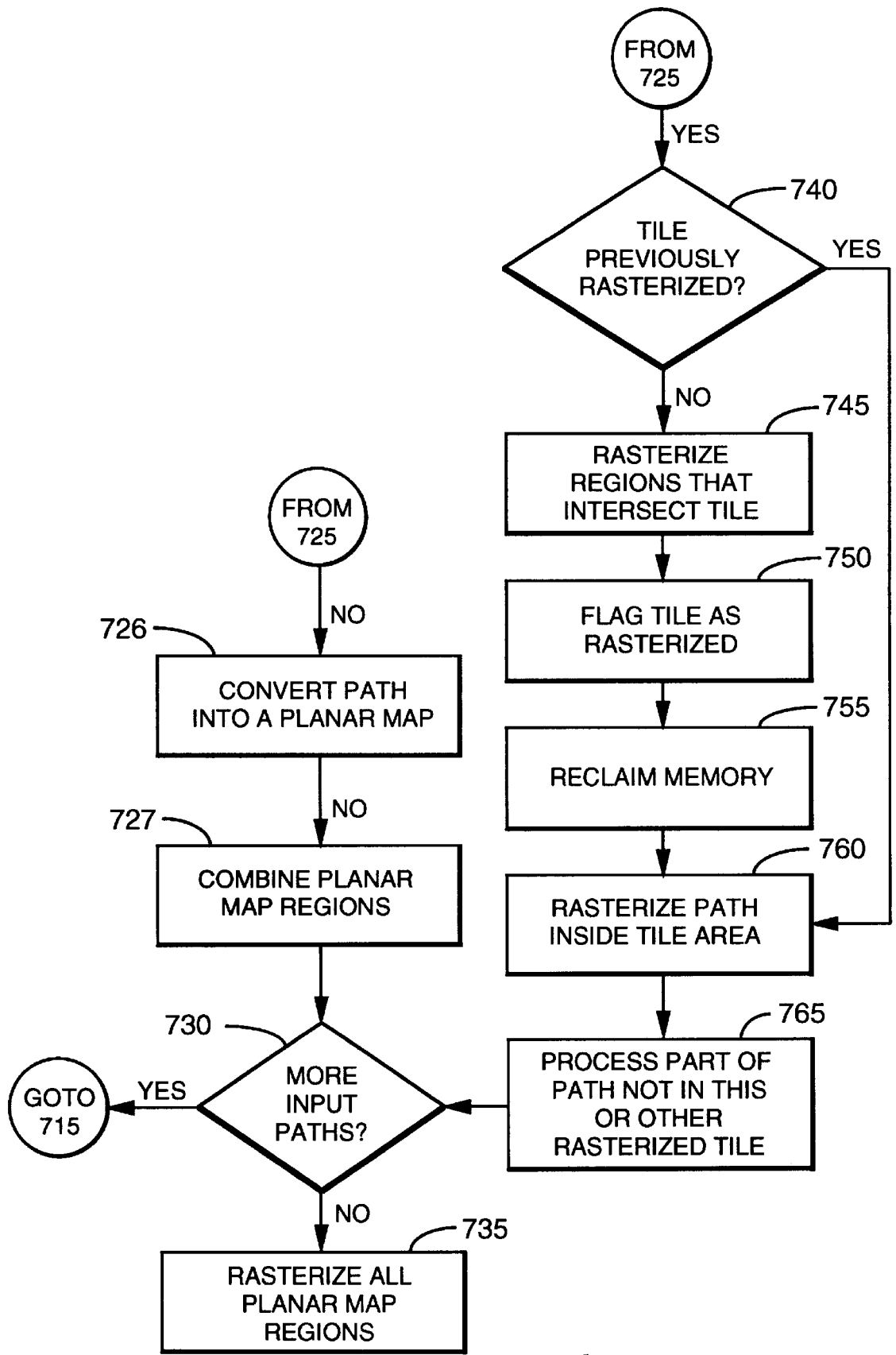

In the embodiment shown in FIGS. 7A and 7B, the PDL input file 700 is transformed into a path based representation (step 705) and the area associated with a page of output is divided into regions or tiles (step 710). Each tile can be a specified size (e.g., one-quarter inch square) or a specified fraction of the page's height and width (e.g., 10%). Each tile has associated with it a complexity value which reflects the memory requirements of those planar map regions that lie within the tile's area. For example, a tile's complexity value could reflect the number of path intersections occurring within its boundary plus the number of local minima and maxima that occur within its boundary. Each tile's complexity value is initialized to zero in step 710. Following page tiling (step 710), an empty planar map for the page being processed is created for later use (step 712). As each path (or pair of paths as described above) is processed at step 715, the complexity value of all those tiles intersected by the path are updated (step 720). If no tile's complexity value exceeds its specified threshold, e.g., 10,000 (the 'no' prong of step 725), the input path is transformed into a planar map (step 726) and the regions of that planar map are combined (step 727) with the regions in the page's planar map (originally created in step 712). If there are no more input paths to process (the 'no' prong of step 730), all of the page's planar map regions are sorted into print order and rasterized to generate a final raster output (step 735). If there are additional input paths that remain to be processed (the 'yes' prong of step 730), processing continues at step 715.

If a tile's complexity threshold is exceeded (the 'yes' prong of step 725), the tile is checked to determine if it has been previously rasterized (step 740). If not (the 'no' prong of step 740), those regions in the page's planar map that intersect the tile are rasterized (step 745) and the tile is flagged as having been rasterized (step 750). Following rasterization, the memory associated with the just-rasterized planar map regions may be reclaimed by the graphical processing system (step 755). If planar map regions are generated so that no region crosses a tile boundary, memory reclamation (step 755) is straight-forward; deallocate the memory associated with the tile and return it to working memory. If planar map regions are generated that can span a tile boundary, the memory reclamation process must determine which parts of which regions lie within the tile being rasterized, and divide them into additional regions; some of which lie within the tile being rasterized and some of which lie outside the tile being rasterized. Next, that part of the input path that intersects the tile whose complexity value has been exceeded is rasterized (step 760). That part of the input path that is not in this, or any other rasterized tile, is converted into one or more planar map regions and combined with the page's planar map (step 765). Processing continues at step 730 where a check is made to determine if additional input paths remain to be processed.

If at step 740 it is determined that the current input path intersects a tile that has been previously rasterized (the 'yes' prong of step 740), processing continues at step 760.

In yet another embodiment, PDL input paths can be converted to planar maps in reverse order to keep the working planar map (i.e., the current collection of planar map regions representing all processed paths) relatively small. In this method, those paths or parts of paths covered by a previous opaque planar map region are ignored. The graphical processing system's planar map structure increases in size approximately only as the number of transparent input paths. If there are few transparent paths in the input PDL file, no matter how complex a collection of paths the PDL file represents, this method can be very memory efficient.

Figure 8A:
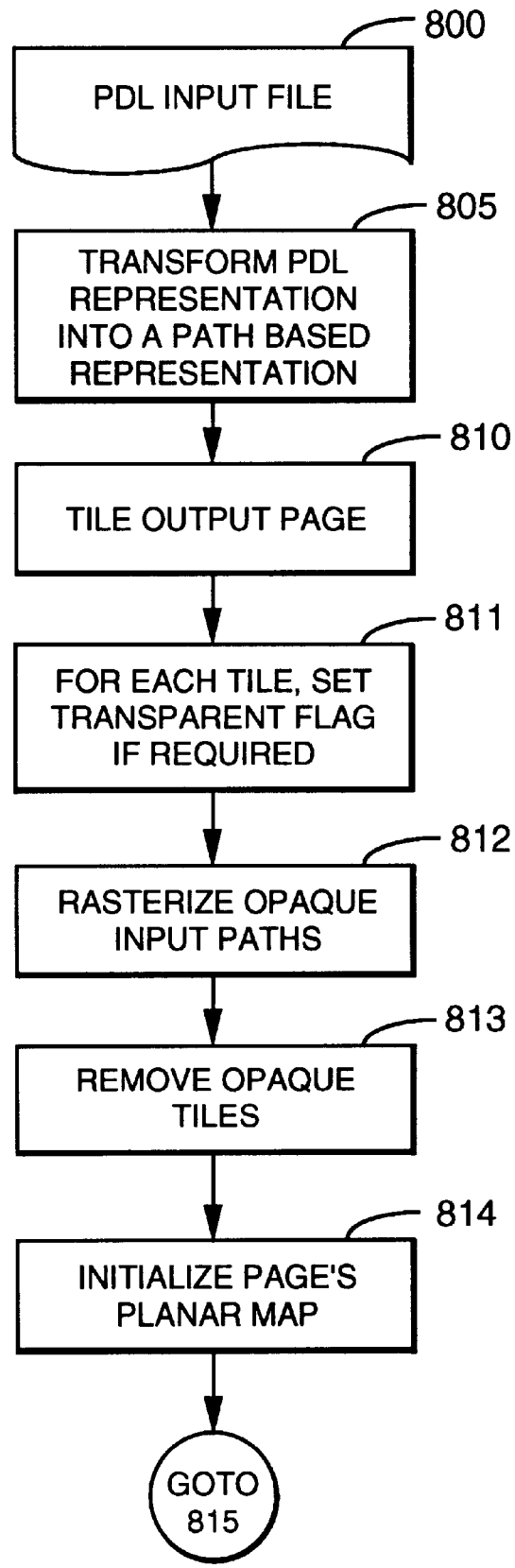
FIGS. 8A and 8B show another processing flow to blend graphical objects using planar maps.
Figure 8B:
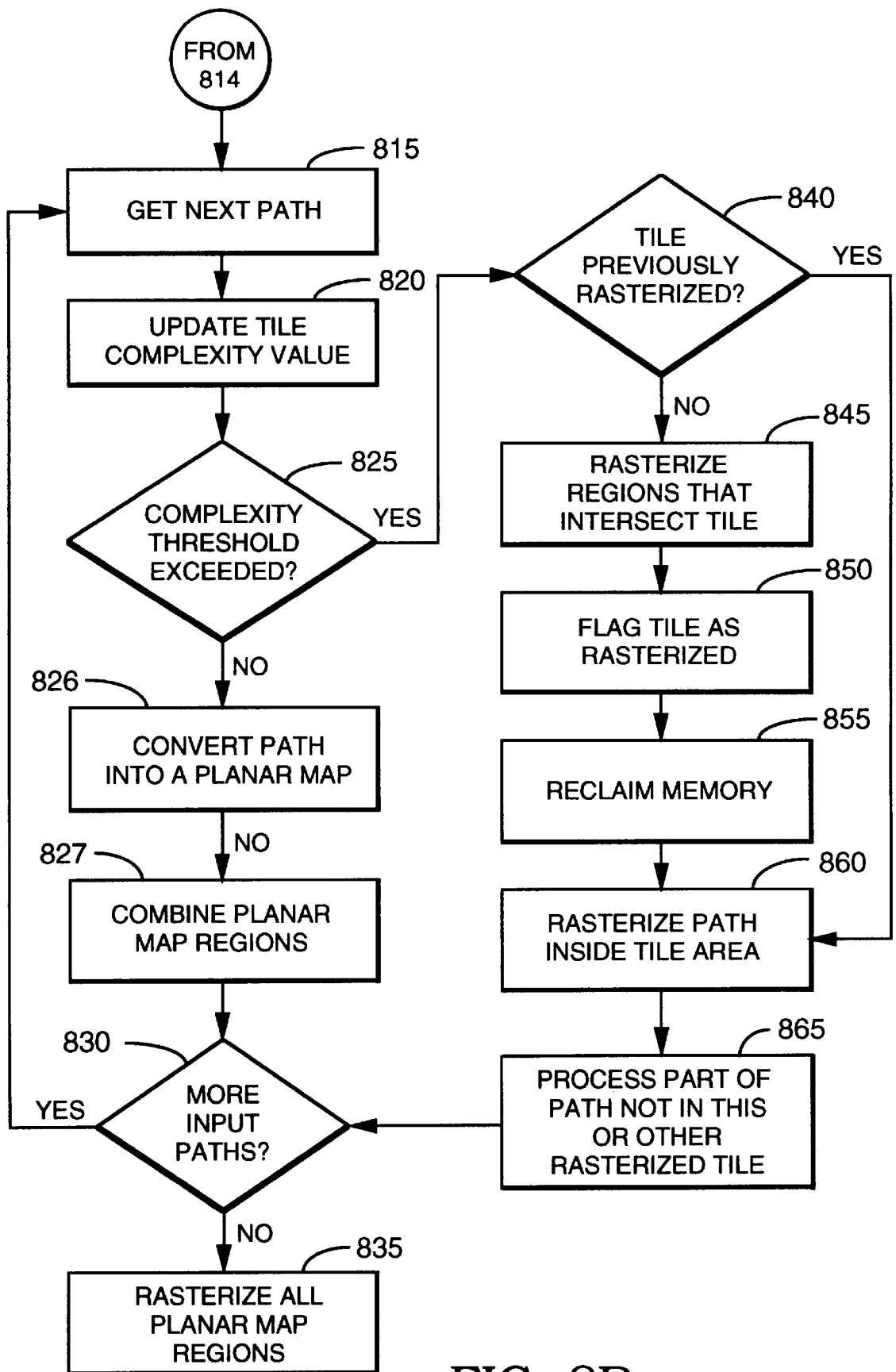

In yet another embodiment (see FIGS. 8A and 8B), a PDL input file 800 is transformed into a path based representation (step 805) and the area associated with a page of output is divided into regions or tiles (step 810). As in the prior embodiment, each tile can be a specified size or fraction of the page's height and width. In this embodiment, each tile has associated with it a complexity value and a TRANSPARENT flag. As each tile is created, its complexity value is initialized to zero and its TRANSPARENT flag is initialized to false (step 810).

For each input path having a transparent portion (e.g., a transparent vector object or an image having at least one region that is not opaque), a bounding box is computed for the path and the TRANSPARENT flag for each tile intersecting the bounding box is set to true (step 811). Next, all opaque input paths are rasterized in the order in which they are received from the PDL input file 800 (step 812). Each tile whose TRANSPARENT flag is false is removed from further consideration (step 813). Those tile's removed are not processed in any remaining step of this operation. Next, an empty planar map is created for later use (step 814).

From this point, paths are processed in their received order (including opaque paths) as described above (FIGS. 7A and 7B), except that no processing is performed for those tiles previously removed. This method can reduce the amount of computation and speed processing when transparency is limited to a relatively small area(s) in the input page.

Figure 9A:
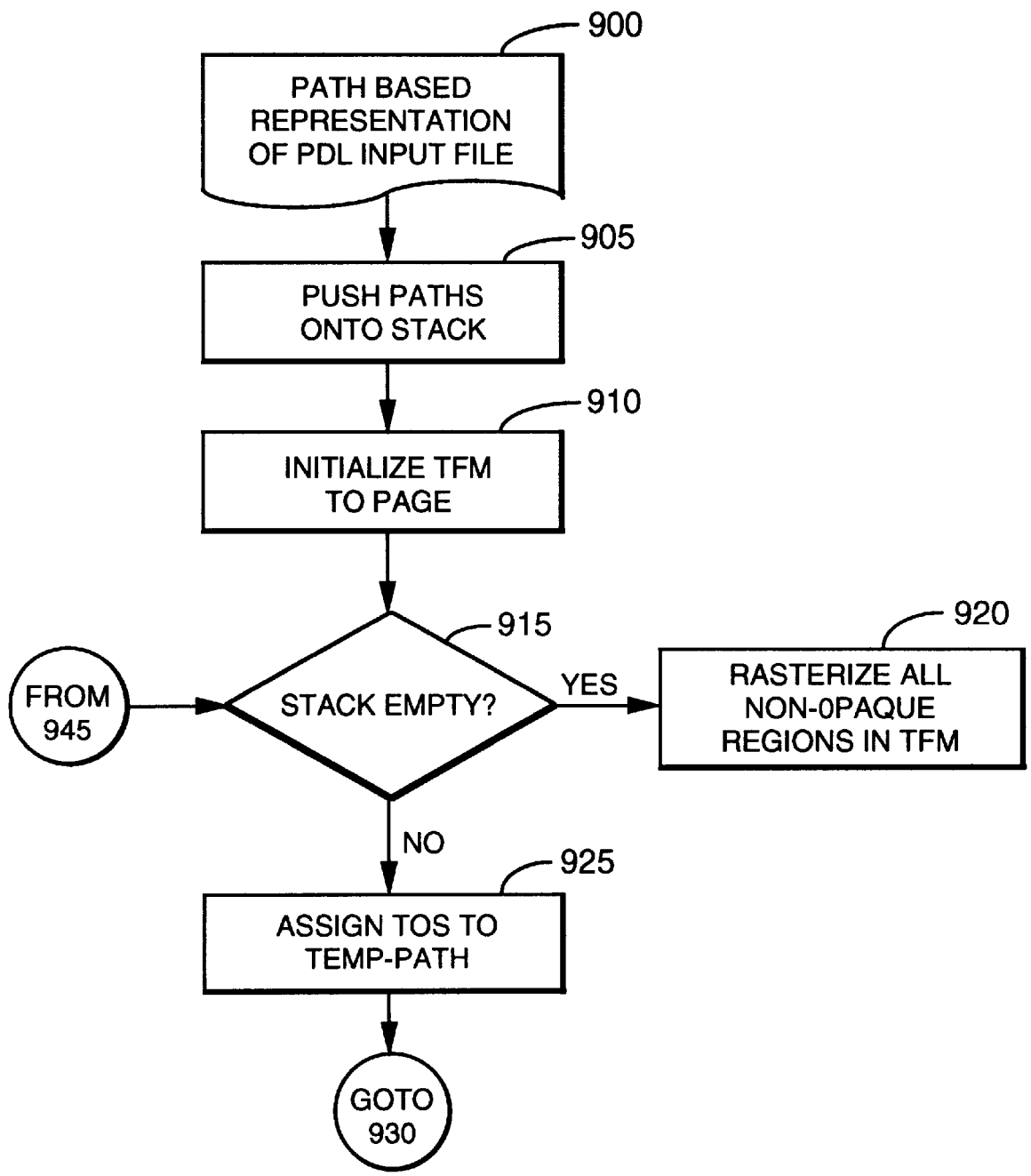
FIGS. 9A and 9B shows a processing flow using planar maps to blend graphical objects in reverse order.
Figure 9B:
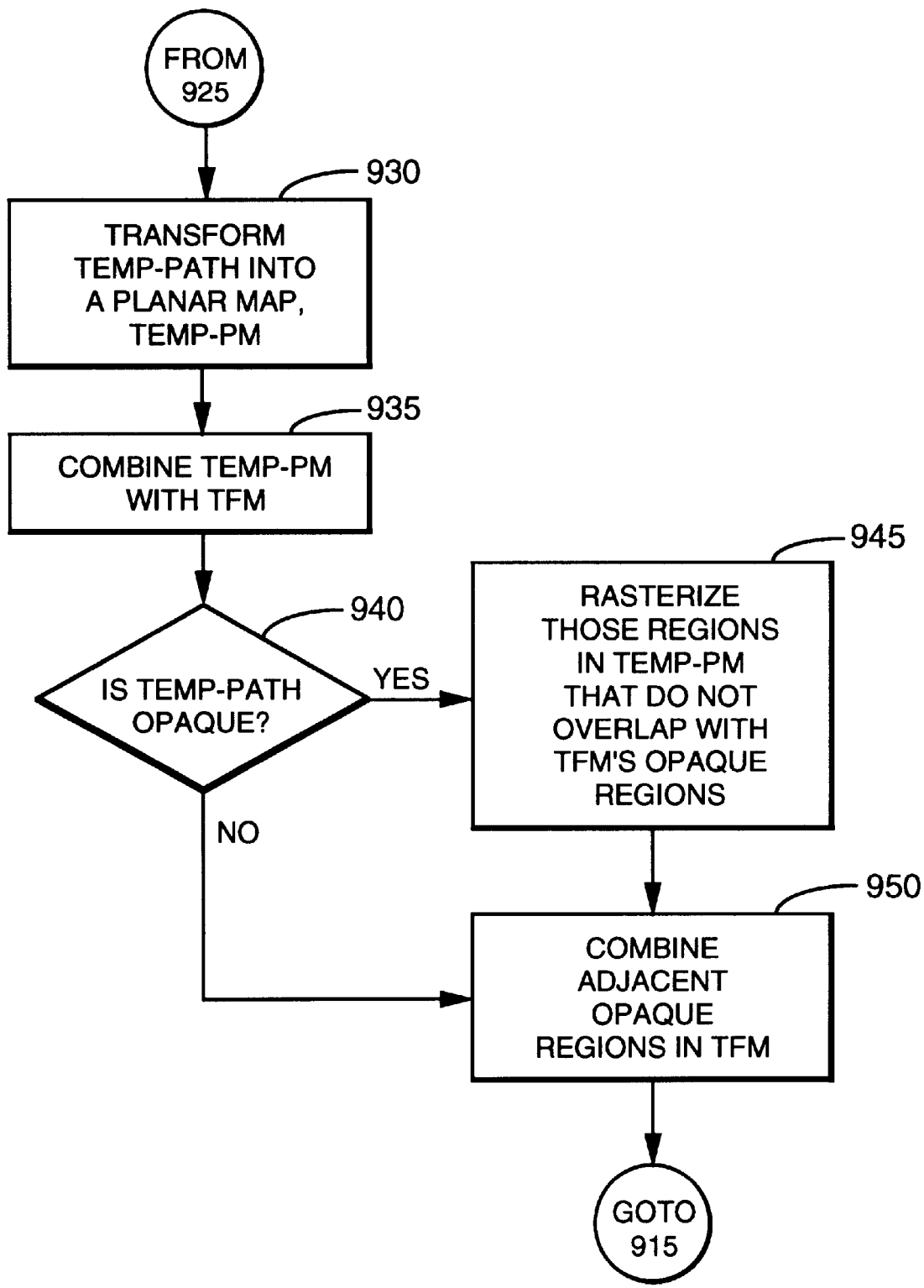

Referring to FIGS. 9A and 9B, each path in the PDL input file 900 is pushed onto a stack (step 905) so that they may be popped off and processed in reverse order; that is, the top most path processed first. A planar map, hereinafter referred to as a transparency filter map (TFM), the size of the page is created at step 910. If the stack is empty (i.e., all input paths have been processed) the 'yes' prong of step 915 is followed and all non-opaque regions in the TFM are rasterized (step 920). If the stack is not empty the 'no' prong of step 915 is followed and the top of stack (TOS) path is popped and assigned to the TEMP-PATH variable (step 925). The TEMP-PATH path is converted into a planar map representation and assigned to the variable TEMP-PM (step 930). The TFM and TEMP-PM planar maps are then combined (step 935). If the TEMP-PATH path is opaque (the 'yes' prong of step 940), those regions in TFM that came from TEMP-PATH and do not overlap with any TFM opaque region are rasterized (step 945); all those regions in TFM that came from TEMP-PATH are also opaque. Next, adjacent opaque regions in the TFM (i.e., those regions sharing a common boundary) are combined into a single region at step 950, and processing continues at step 915. If TEMP-PATH is not opaque (the 'no' prong of step 940), processing continues at step 950.

The present invention has been described in terms of specific embodiments, which are illustrative of the invention and not to be construed as limiting. The invention may be implemented in hardware, firmware, software, or a combination of them. Other embodiments are within the scope of the following claims.

What is claimed is:

1. A method to blend graphical objects comprising:
   obtaining a page description language representation of the graphical objects, the graphical objects having transparency characteristics and color characteristics;
   converting a portion of the page description language representation into a planar map representation, the planar map representation having a plurality of planar map regions wherein each planar map region is associated with one or more of the graphical objects; and
   assigning a color to at least one planar map region as a function of the transparency characteristics and color characteristics of the graphical objects associated with the planar map region.

2. The method of claim 1 further comprising sorting the planar map regions into a print order.

3. The method of claim 2 further comprising rasterizing the print ordered planar map regions.

4. The method of claim 1 wherein the transparency characteristics indicate the opacity of the graphical object.

5. The method of claim 1 wherein the transparency characteristics are given by a plurality of pixels wherein each pixel provides a transparency value and a color value.

6. The method of claim 1 wherein the portion includes less than the entire page description language representation.

7. The method of claim 1 wherein the portion includes the entire page description language representation.

8. The method of claim 1 wherein the graphical objects are in a first order in the page description language representation, and are converted to a planar map representation in a second order.

9. The method of claim 8 wherein the first order is bottom-to-top, and the second order is top-to-bottom.

10. The method of claim 1 wherein the page description language is the POSTSCRIPT language.

11. A method to blend graphical objects comprising:
   (a) receiving graphical objects represented in a page description language, the graphical objects having transparency characteristics and color characteristics;

(b) converting a first graphical object in the page description language representation into a first planar map, the first planar map having regions associated with the first graphical object;

(c) converting a second graphical object in the page description language representation into a second planar map, the second planar map having regions associated with the second graphical object;

(d) combining the first and second planar maps, the combined planar map having regions;

(e) tagging a region in the combined planar map to indicate which graphical objects are associated with the region; and (f) assigning a color to the tagged region as a function of the transparency characteristics and color characteristics of the graphical objects associated with the tagged region.

12. The method of claim 11 wherein steps (c) through (f) are repeated.

13. The method of claim 11 wherein steps (c) through (f) are repeated until all of the graphical objects in the page description language representation have been blended.

14. The method of claim 11 further comprising sorting the planar map regions of the combined planar map into a print order.

15. The method of claim 14 further comprising rasterizing the print ordered planar map regions.

16. The method of claim 11 wherein the transparency characteristics are given by a plurality of pixels wherein each pixel provides a transparency value and a color value.

17. The method of claim 11 wherein the graphical objects are in a first order in the page description language representation, and are converted to planar maps in a second order.

18. The method of claim 17 wherein the first order is bottom-to-top, and the second order is top-to-bottom.

19. The method of claim 11 wherein the page description language is the POSTSCRIPT language.

20. A method to blend graphical objects comprising:

(a) obtaining a page description language representation of the graphical objects, the graphical objects having transparency characteristics and color characteristics;

(b) converting a first two graphical objects in the page description language representation into a first planar map, the first planar map having regions associated with the first two graphical objects;

(c) converting a second two graphical objects in the page description language representation into a second planar map, the second planar map having regions associated with the second two graphical objects;

(d) combining the first and second planar maps, the combined planar map having regions;

(e) tagging a region in the combined planar map to indicate which graphical objects are associated with the region; and (f) assigning a color to the tagged region as a function of the transparency characteristics and color characteristics of the graphical objects associated with the tagged region.

21. The method of claim 20 wherein steps (c) through (f) are repeated.

22. The method of claim 20 wherein steps (c) through (f) are repeated until all of the graphical objects in the page description language representation have been blended.

23. The method of claim 20 further comprising sorting the planar map regions of the combined planar map into a print order.

24. The method of claim 23 further comprising rasterizing the print ordered planar map regions.

25. The method of claim 20 wherein the transparency characteristics are given by a plurality of pixels wherein each pixel provides a transparency value and a color value.

26. The method of claim 20 wherein the graphical objects are in a first order in the page description language representation, and are converted to planar maps in a second order.

27. The method of claim 26 wherein the first order is bottom-to-top, and the second order is top-to-bottom.

28. The method of claim 20 wherein the page description language is the POSTSCRIPT language.

29. A method to blend graphical objects comprising:

(a) obtaining a page description language representation of the graphical objects, the graphical objects having transparency characteristics and color characteristics;

(b) converting a portion of the page description language representation into a planar map representation, the planar map representation having regions wherein each region is associated with one or more of the graphical objects;

(c) assigning a color to a planar map region as a function of the transparency characteristics and color characteristics of the graphical objects associated with the planar map region;

(d) sorting the planar map regions into a print order; and (e) rasterizing a second portion of the print ordered planar map regions.

30. The method of claim 29 wherein the portion of planar map regions comprise those planar map regions associated with a specified area on an output page.

31. The method of claim 29 wherein the portion of planar map regions comprise all of the planar map regions.

32. The method of claim 29 wherein the transparency characteristics are given by a plurality of pixels wherein each pixel provides a transparency value and a color value.

33. The method of claim 29 wherein the portion of planar map regions comprises less than the entire page description language representation.

34. The method of claim 29 wherein the portion of planar map regions comprises the entire page description language representation.

35. The method of claim 29 wherein the graphical objects are in a first order in the page description language representation, and are converted to planar maps in a second order.

36. The method of claim 35 wherein the first order is bottom-to-top, and the second order is top-to-bottom.

37. The method of claim 29 wherein the page description language is the POSTSCRIPT language.

38. A graphical processing system comprising:

a receiver adapted to receive a page description language representation of graphical objects, the graphical objects having transparency characteristics and color characteristics; and a converter operatively coupled to the receiver, the converter adapted to convert a portion of the page description language representation into a planar map representation, the planar map representation having regions wherein each region is associated with one or more of the graphical objects, and assign a color to a planar map region as a function of the transparency characteristics and color characteristics of the graphical objects associated with the planar map region.

39. The system of claim 38 further comprising a sorter operatively coupled to the converter, wherein the sorter is adapted to sort the planar map regions into a print order.

40. The system of claim 39 further comprising a rasterizer operatively coupled to the sorter for rasterizing the sorted planar map regions.

41. The system of claim 38 wherein the transparency characteristics are given by a plurality of pixels wherein each pixel provides a transparency value and a color value.

42. The system of claim 38 wherein the graphical objects are in a first order in the page description language representation, and are converted to planar maps in a second order.

43. The system of claim 42 wherein the first order is bottom-to-top, and the second order is top-to-bottom.

44. The system of claim 38 wherein the page description language is the POSTSCRIPT language.

45. A method to blend graphical objects, comprising:

obtaining a page description language representation of graphical objects, each graphical object having transparency characteristics and color characteristics, the graphical objects being associated with an input page;

tiling an output page corresponding to the input page, each tile having a flag initially set to false;

setting a tile flag to true if any transparent graphical object intersects the tile;

rasterizing all opaque graphical objects;

removing a tile from the output page if its flag is false;

converting a first graphical object into a first planar map, the first planar map having regions associated with the first graphical object;

converting a second graphical object into a second planar map, the second planar map having regions associated with the second graphical object;

combining the first and second planar maps, the combined planar map having regions;

tagging a region in the combined planar map to indicate which graphical objects are associated with the region; and assigning a color to the tagged region as a function of the transparency characteristics and color characteristics of the graphical objects associated with the tagged region language.

46. The method of claim 45 further comprising sorting the planar map regions of the combined planar map into a print order.

47. The method of claim 46 further comprising rasterizing the print ordered planar map regions exclusive of those regions corresponding to the removed tiles.

48. The method of claim 45 wherein the transparency characteristics are given by a plurality of pixels wherein each pixel provides a transparency value and a color value.

49. The method of claim 45 wherein the page description language is the POSTSCRIPT language.

* * * * *